US006915952B1

(12) United States Patent
Allen

(10) Patent No.: US 6,915,952 B1
(45) Date of Patent: *Jul. 12, 2005

(54) METHOD OF TRACKING TOOLS

(75) Inventor: Philip L. Allen, Palatine, IL (US)

(73) Assignee: UFP Technologies, Inc., Addison, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/878,759

(22) Filed: Jun. 28, 2004

Related U.S. Application Data

(63) Continuation of application No. 10/349,056, filed on Jan. 22, 2003.

(51) Int. Cl.[7] .............................................. G06F 17/60
(52) U.S. Cl. ..................................... 235/385; 235/487
(58) Field of Search ................. 235/385, 462.09–462.1, 235/485, 487, 494

(56) References Cited

U.S. PATENT DOCUMENTS

| | | | | |
|---|---|---|---|---|
| 4,720,907 A | * | 1/1988 | Rapp | 235/439 |
| 4,882,867 A | * | 11/1989 | Linden | 40/625 |
| 5,023,437 A | * | 6/1991 | Speicher | 235/432 |
| 5,284,087 A | * | 2/1994 | Vaarala | 101/32 |
| 5,320,223 A | | 6/1994 | Allen | |
| 5,971,130 A | * | 10/1999 | Nakamura | 198/340 |
| 6,007,929 A | * | 12/1999 | Robertson et al. | 428/195.1 |
| 6,176,434 B1 | * | 1/2001 | Baldur | 235/494 |
| 6,533,181 B1 | * | 3/2003 | Roxby et al. | 235/494 |
| 6,568,593 B2 | * | 5/2003 | Hetzer | 235/385 |
| 6,666,255 B2 | * | 12/2003 | Cantwell | 164/98 |

OTHER PUBLICATIONS

Industrial Laser Systems and Services, LLC Introduction to Data Matrix Symbology Training Manual (date unknown).
Cermark Data Information Laser Marking Product (date unknown).
Ferro Technical Information for Organic Coating Product (date unknown).

* cited by examiner

*Primary Examiner*—Thien M. Le
*Assistant Examiner*—Edwyn Labaze
(74) *Attorney, Agent, or Firm*—Robert L. Marsh

(57) ABSTRACT

To track a large number of tools, the tools are kept in sets with each set having a container. A silhouette of each tool stored in the container is printed at the point of storage along with a dat matrix code that has stored in binary code a description of the tool, the part number, and an identification of the kit of which it is a part. The associated tool has etched into the surface thereof a data matrix code containing the same information as the code printed at the point of storage. The data matrix codes are readable by a scanner and a record of all the tools is maintained on a computer.

12 Claims, 3 Drawing Sheets

METHOD OF TRACKING TOOLS

This is a continuation of my co-pending application filed Jan. 22, 2003 and assigned Ser. No. 10/349,056. The present invention relates to a system for identifying, controlling, and tracking tools in an environment in which the misplacing of a single tool can have serious financial, productivity, and safety consequences, and in particular a method for providing an electronic control for the use of every tool utilized in the manufacturing operation and technical service function. The invention is a tool management system in which electronically scan/ read technology is used to read 2D Data Matrix symbology from tool surfaces previous considered to be unsuited for receiving scannable electronic codes.

BACKGROUND OF THE INVENTION

The current systems for controlling tools do not provide for total tool accountability. Total accountability requires that every tool have a place, every tool must be in its place, and for any tool that is not in its place a trail leads to the last authorized user of the tool and the task on which it was used. And if a lost tool is found, the exact location of its origin is known. For example, using currently available tool control systems, when a tool is found on an airplane, its origin cannot be positively identified. The tool may be identical to one that is missing from a tool kit at one air force base, but nonetheless, the tool could have been left on the plane while it was at an entirely different base. To overcome this, the Air Force, the Aerospace industry, and private industry is looking for a new system that will positively track and control every tool in its system. The tracking and control system should positively link each tool to a base and squadron, along with the kit's name, origin, and include a list of all the other components of the kit. Further, the last authorized user of the kit and the plane on which the tool was last used (Aircraft, Kit Number, Tool Number, Tool date of purchase, and variable local use information) should also be available.

Tool control is very important in the military and Aerospace industries. A tool left in the engine of an aircraft could damage the engine and perhaps the whole plane. A tool left in the engine compartment of a helicopter or on the space shuttle can have similar consequences. The danger becomes compounded during military exercises and missions when fighters returning from a mission must be refueled and rearmed within a minimum time and returned to combat. Technical Services personnel are expected to perform their tasks within predetermined time constraints so as not to delay the return of the plane to combat. The military and Aerospace Industry refer to damage caused by tools left on board military vehicles as "foreign object damage"or FOD/ FOE. FOD/FOE Control is a high priority in the military/ management issue. The air force uses the term TAS, which stands for "Tool Accountability System" for its program to control FOD and other branches of the military and certain industries of civilian commerce use other terms for dealing with the same problem.

The manufacturers of airplanes use manual and visual methods to track every tool that is used in the course of assembling or servicing a plane. If all the tools cannot be accounted for, the plane must be searched or possibly x-rayed before it is placed in service. The importance the Air Force's places on Tool Control is evidenced by the fact that it is a court martial offense the first time a technician leaves a tool on board an airplane without telling a Sergeant and therefore, every technician must know exactly what tools he has brought on board the airplane so he will know if any are missing.

It has become the practice to assemble tool kits with each tool kit containing the exact tools a technician would need to work on a specific air or space vehicle. For example, if an air force base has only two or three helicopters fitted for certain weapons systems, a number of tool kits will be specifically prepared for use by technicians working on those helicopters.

Currently, the tools are monitored by assembling them into a kit in which the tools are mounted on a vertical shadow board or are inserted into shadow boxes in the pockets of pallets or drawer inserts. Each shadow board, shadow box, pallet or insert has, at the point of retention of a tool, the silhouette of the tool to be retained. At the bottom of each pocket, or printed on each silhouette, is the description of the tool to be retained therein and the part number. The kits are kept in a controlled environment until they are assigned to a specific technician who is responsible for returning the kit with all the tools in each of the associated pockets therefore; inventory—tool in and out.

The technology is currently available to print information on any tool in a form that is readable with the human eye; however, space limitations on the surface of the tool limit the amount of information that can be visually readable. It is the practice to print the tool number on the tool using Arabic numbers and English letters, but the more detailed information about the tool such as the name of the base, the squadron number, and the kit number is rarely printed on the surface thereof.

Prior efforts to use a traditional bar scanner or computerized tracking and computer readable codes to monitor tools have not been successful for a number of reasons. Because of their functional nature, tools have surfaces, which in the past have been considered unsuitable for receiving the known methods of applying a conventional bar code of the type readable or scannable code by a computer. A linear bar code requires a flat surface and for some tools there are no flat surfaces suitable for receiving a conventional bar code. The material of which the tool is made is also functional and is generally unsuitable for receiving a conventional bar code. Prior to the present invention, there has been no suitable method for applying an electronically readable code to chrome, stainless steel, black oxide metal, coated steel, plastic, rubber, wood, or to a concave or a convex surface.

Chrome surfaces are applied to tools to protect the metal of which the tool is made from rust or other forms of deterioration. The chrome surface provides a function, which extends the useful life of the tool, but chrome is reflective and electronic codes applied to a chrome surface using existing technology are unreadable by a scanner because the scanner is unable to detect sufficient contrast between marked and unmarked portions of the surface. Black oxide surfaces are totally non-reflective and electronic codes applied to black oxide using existing technologies are also unreadable. Similarly, plastic, rubber, and wood are not suitable media for receiving readable electronic codes. It is also unsatisfactory to provide a label to be attached to the surface of a tool because there is a risk that the label itself may become detached from the tool and become a source of FOD.

It should be appreciated that a system employing an electronically readable coding is of little value to the military unless the system will operate with a very low incidence of failure. If wear of the type ordinarily suffered to the surface of a tool will render the electronic coding on the surface unreadable, the tool will not be identifiable when it is found on a plane and the system will have failed when it is needed most.

SUMMARY OF THE INVENTION

Briefly, the present invention is embodied in a method of controlling tools where a plurality of different tools are grouped together into a set and identified to perform a given task, and where each of the plurality of tools has an associated control number or identifier. The method envisions that the tools are retained in a suitable retainer in which each of the plurality of tools has a predetermined location. The retainer may be a toolbox or a flexible bag containing a plurality of pallets with the pallets having an indentation or pocket for each of the plurality of tools. As an alterative, the tools may be maintained in a rigid vertical shadow board or in a shadow box with suitable brackets for retaining each of the tools. Regardless of the retention method, one aspect of the invention is that as much information as possible about each tool is printed at the point of retention in a manner that is understandable using the unaided eye. Specifically, a silhouette of the tool is provided at the point of retention. Where the tool is retained in a pocket, the pocket may be shaped in the silhouette of the tool, and where the tool is retained by a bracket mounted on a vertical surface, the silhouette may be printed on the underlying surface. Also, the part number or other identifier and as much additional information as space will allow is printed on the surface of the tool so as to be readable by the human eye.

It is desirable that the coloring of the silhouette contrast sharply with the surrounding background and with the coloring of the tools to be inserted. For example, the silhouettes may be a bright yellow or bright red in color and the surrounding background black or gray. Where the pockets of a pallet are shaped into the silhouette of a tool, the bright coloring will be applied to the bottom surface of the pocket. The bright red or yellow color tells a mechanic that one of the pockets of his pallet is empty and a tool is missing.

The invention also requires that an electronically readable code of the part number of each tool be etched into the surface of the tool, and another copy of the electronically readable code be fixed at the location for retaining the tool. To carry out the invention, the method further includes the use of an appropriate scanner for reading the electronically readable codes and a computer memory for storing all the relevant information pertaining to the tools.

To avoid potential FOD problems, the electronically readable code must be etched into the surface of the tool. For the system to operate effectively, the code must be readily readable even though the surface of the tool has been scratched or otherwise marred or obstructed. The code must be readable through a layer of grease or soil that remains on a tool after a technician has attempted to clean the coded portion of the tool with his finger or a piece of cloth.

We have found that tool surfaces which have previously been considered unsuitable for receiving an electronically readable code can be prepared for receiving a laser etching of a two dimensional code, also known as data matrix symbology. A tool laser etched with data matrix symbology is readable on a tool by a scanner even though the surface is curved, the tool has been in use for a long period of time, it has become worn or damaged.

To render a chrome surface suitable for receiving a code, the surface is roughed up using an abrasive incorporating a silica or the like, after which an epoxy coating is applied to the prepared surface. Thereafter, a laser etching will bond the epoxy to the chrome where the laser beam has struck. The unbonded excess chemical is then removed, after which the portions marked by the laser will provide sufficient contrast against the underlying sand blasted chrome surface to provide sufficient contrast for a two dimensional data matrix code to be readable.

For tools having a black oxide coated surface the black oxide is sand blasted off of a portion large enough to receive a data matrix symbology after which an epoxy coating is applied prior to laser etching. In the case of wood, rubber, or plastic, a pocket is cut into the surface of the material and the pocket is filled with an epoxy suitable for receiving a laser etching. A laser is then used to etch the surface of the epoxy.

One advantage of a data matrix symbology over a conventional linear bar code is that it is more reliably readable by a scanner. A conventional linear bar code requires at least eighty-percent contrast to be readable by a scanner, whereas data matrix symbology requires only a twenty-percent contrast. The data matrix symbology will also resist loss of information due to physical damage to the surface on which the code has been applied.

The use of a data matrix symbology has many other advantages over the conventional linear bar code. By being two dimensional, a relatively small data matrix symbology can hold twenty-five to one hundred times the information of a conventional linear bar code occupying the same amount of space. The greater retention capabilities of a data matrix symbology allow a great deal of information to be applied to the surface of the tool itself. The code on the tool may identify not only the type of tool and the tool number or other identifier, it may include any other information related to the identity of the tool. For example, it may include that the tool is the property of the US Air Force, the name of the base from which the tool came, the squadron number, and the TAS number; that is, the Tool Accountability System number. The TAS number is a nine-digit number, which identified the tool kit in which the tool belongs. The data matrix symbology also has a verifiable information field for receiving such information as the acquisition date of the tool and, if the tool requires periodic sharpening or recalibration, the date the tool was last sharpened or calibrated.

The greater storage capabilities of the data matrix symbology can be used to resist loss of information due to damage of the coded portion of the tool by providing redundant recitations of the recorded information within the same coded area. Further protection against loss of information is provided by applying the data matrix symbology at two locations on the surface of the tool.

In accordance with the method of the present invention, the code for each tool of a tool kit is applied to the associated tool, to the surface of the tool kit at the location where the tool is retained, and to a printed listing of the tools that make up the kit. Where the kit is one of many being utilized on a military facility, such as an air force base, the computer will retain a record of all of the kits and of the names and serial numbers of the technicians to whom they have been assigned. When a tool is missing from a kit the technician who made last use of the kit and the plane that was serviced will also be stored in the memory of the computer and be readily available for later use. When a tool is found in an aircraft, a simple reading of the code applied to the tool will positively identify the source of the tool, the technician who last used it, and the date it was misplaced. Similarly, if an empty pocket or retaining bracket indicates the absence of a tool, a reading of the code at the point of retention of the tool will provide complete identification of the missing tool. If the tool is not located following a search, the computerized records will continue to retain the information regarding the missing tool until it is ultimately located. This system therefore provides a closed loop for accounting for all the tools employed in a large system such as occurs at an air force base or on an aircraft carrier.

BRIEF DESCRIPTION OF THE DRAWINGS

A better understanding of the present invention will be had after a reading of the following detailed description taken in conjunction with the drawings wherein.

DETAILED DESCRIPTION OF PREFERRED EMBODIMENT

Referring to FIGS. 1–5 and 7, a set of tools needed to perform a task on a military base are stored in a suitable storage means. The most commonly used means of storing tools is a tool box having a plurality of drawers with the tools of the box laid out so that all the tools in the drawer are visible when the drawer is opened. Another commonly used method is to retain the tools on vertical boards, which line the perimeter of a work area. A third method used by mechanics who service combat planes that have returned from one mission and are to be made ready for a subsequent mission, employs a flexible bag that has a number of zippered compartments with two pallets of tools stored in each of the compartments. There are other methods of storing tools, but these are the methods most commonly used.

Referring to FIGS. 2 through 5, the tools of a certain set are, for the purpose of this discussion, stored in a flexible bag 10. The bag 10 has on its outer surface an identification tag 12, and printed on the tag 12 in English (or any other language that is appropriate), so as to be readable with the unaided eye, is an identification number for the tool set and information about the origin of the tool set such as the division of the armed forces, the name of the base, the squadron number, and the type of craft or vehicle within the squadron to be serviced by the set of tools. The same identification information is also encoded in two-dimensional data matrix symbology 14, which is also printed on the tag 12.

Figure 1:
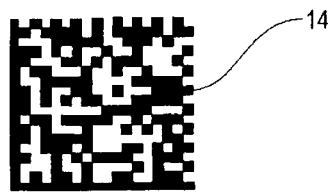
FIG. 1 is a greatly enlarged front elevational view of a data matrix code of the type useable with the present invention.
Figure 2:
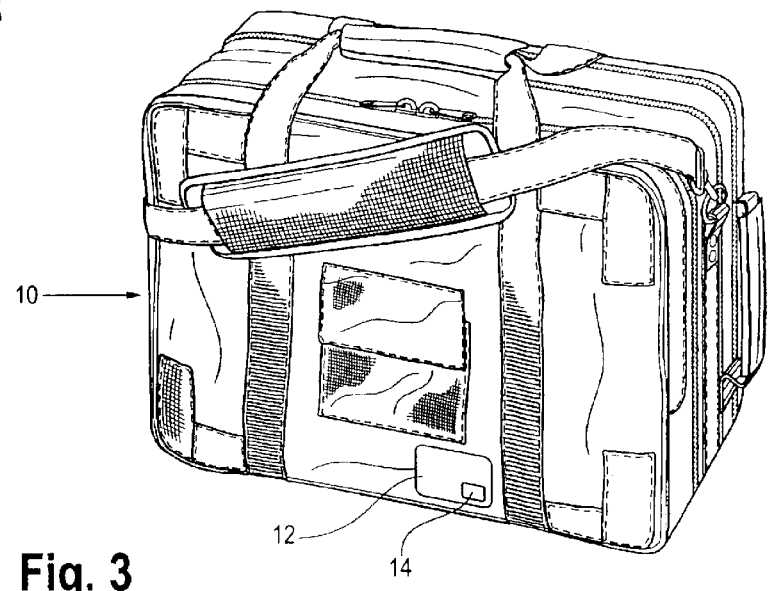
FIG. 2 is an isometric view of a tool bag where the tool bag representing one of many methods for defining a tool kit used in the control system of the present invention.
Figure 3:
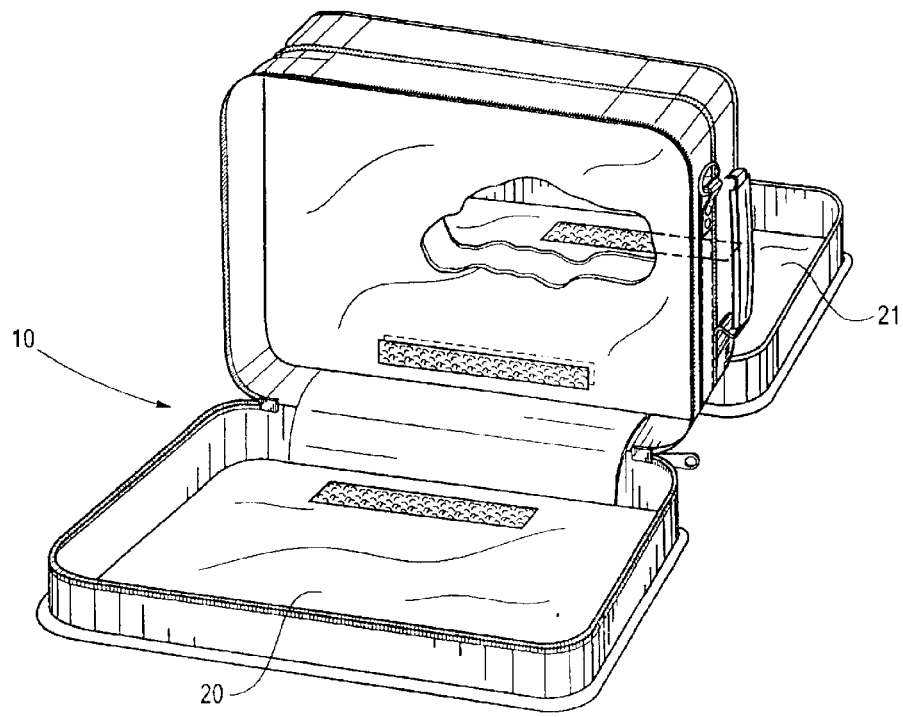
FIG. 3 is an isometric view of the tool bag shown in FIG. 2 with the two side panels thereof if the open position.
Figure 7:
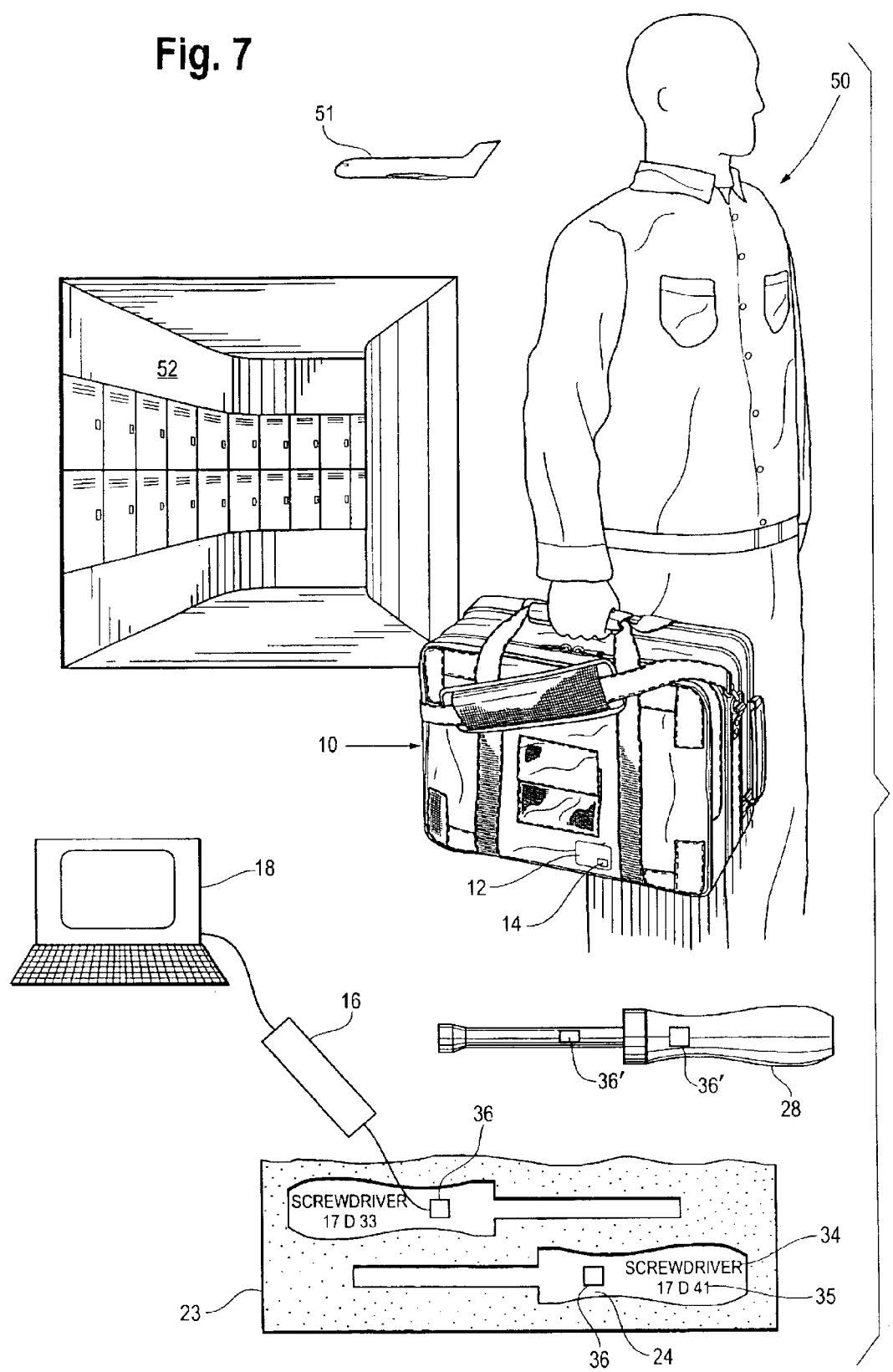
FIG. 7 shows a schematic diagram of the elements of the present invention, including the tool bag of FIG. 2, the tools, and the list of part numbers shown in FIG. 6, a scanner for reading the bar codes, and the computer for retaining records of all the pertinent information relating thereto.

As best shown in FIGS. 1 and 7 the data matrix symbology 14 employs a rectangular paftem of dots or squares, appearing something like a checkerboard but without the rigid alternation of black followed by white followed by black and so forth. The squares of the matrix are black or white, black being either a zero or a one and white being the other of the zero and a one such that each square is a digit of a binary code. All the information pertaining to the bag 10 is imprinted in the binary code on the data matrix symbology 14. The data matrix symbology 14 is readable by a scanner 16 of the type known in the art and all the information read by the scanner 16 is stored in the memory of a computer 18.

Figure 4:
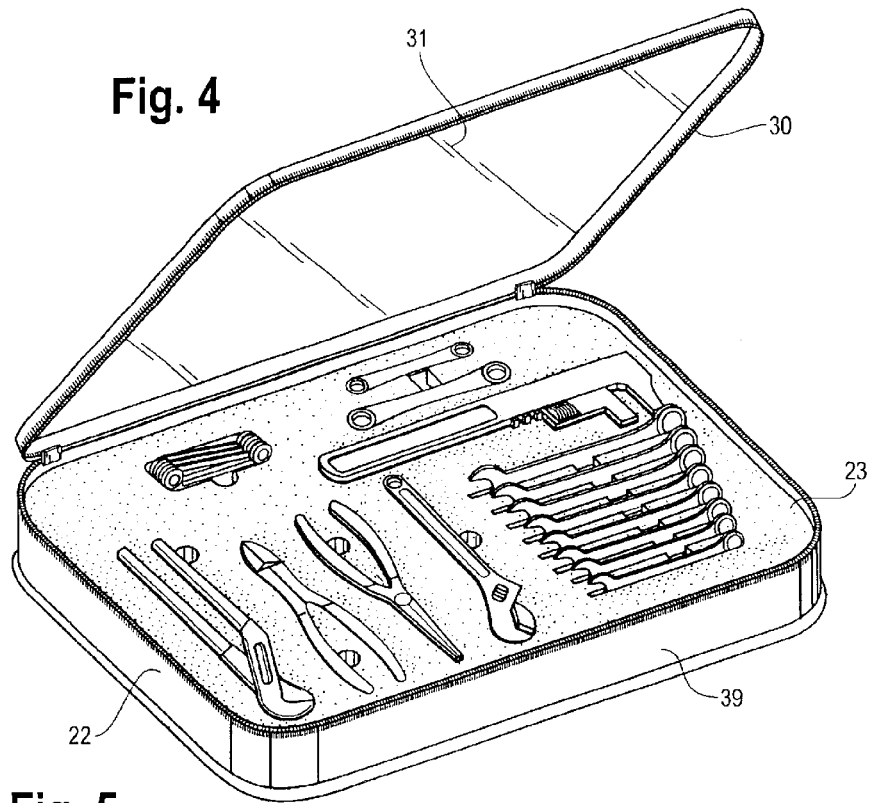
FIG. 4 is an isometric view of a pallet of tools suitable for insertion into the tool bag shown in FIG. 2.
Figure 5:
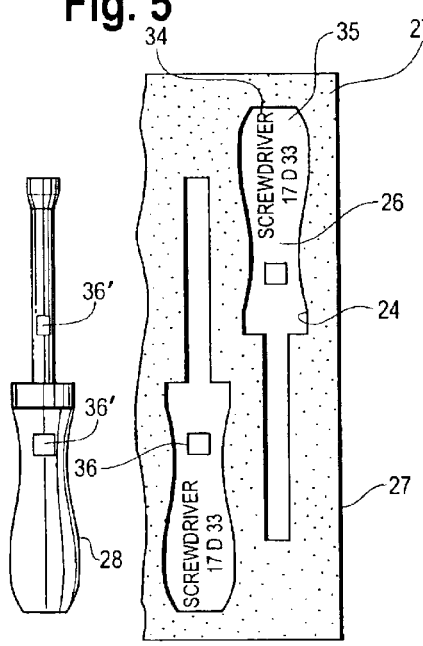
FIG. 5 is a fragmentary, isometric view of a pallet similar to that shown in FIG. 4 with the tools thereof exploded out of the pallet so as to show the part number and data matrix code printed at the bottom of the pocket thereof and showing the code printed on the respective tools.

Referring to FIGS. 2 through 5, the bag 10 is divided into two equal compartments 20, 21 each of which is opened or closed by means of a heavy-duty zipper (not shown). Each of the compartments 20, 21 contains two pallets of tools, one of which 22 is shown in FIGS. 4 and 5. Each pallet 22 consists of a foam body 23 with a plurality of indentations or pockets 24 therein, with each pocket 24 shaped in the silhouette of the tool 28 to be retained therein. In the preferred embodiment, the lower surface 26 of the pocket 24 is a bright color such as a yellow or a red, so as to contrast greatly with the color of the upper surface 27 of the foam body 23 and thereby be readily visible when the pocket 24 is not occupied by the correct tool 28.

As best shown in FIGS. 4 and 5, each foam body 23 is enclosed in a flexible plastic container 29 having a flexible top 30 with a transparent window 31. A sturdy zipper 32 closure seals the edges of the top 30 to the edges of the contained 29 when the container 29, with the foam body 23 therein, is stored in one of the compartments 20, 21 of the bag 10.

In accordance with the invention, printed at the bottom of each pocket 24 is a description 34 of the tool 28, the description 34 printed in English or in any language that is readable by the unaided eye, and the part number or other identifying symbol (identifier) 35 of the tool 28 to be retained therein. Adjacent the printed information 34, 35 is a data matrix symbology 36 similar to the data matrix symbology 14 on the bag 10. The data matrix symbology 36 within each pocket 24 contains in binary code the description 34 of the tool 28 to be retained therein, the identifier 35 of the tool 28, and all the information regarding the tool kit 10 printed on the information tag 12. The data matrix symbology 36, will also contain in binary code any other information relevant to the tool 28, such as the date the tool was placed in service, the date it was last sharpened or calibrated, and the like.

Figure 6:
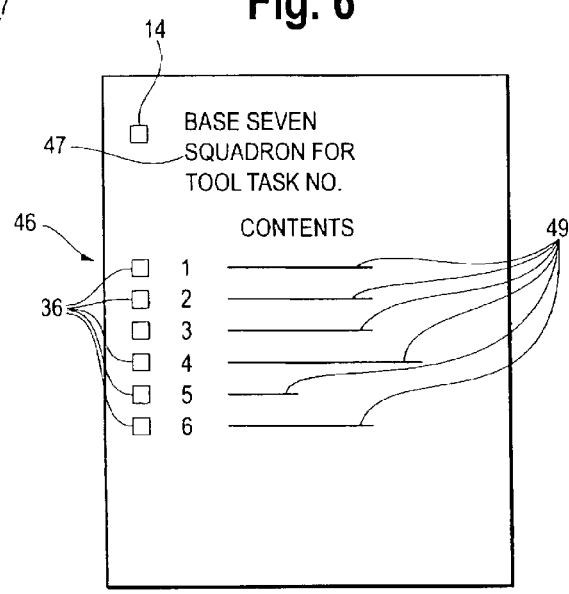
FIG. 6 shows a tool list for the tools of a kit of the type enclosed in the bag shown in FIG. 2 with the data matrix symbology associated with each tool set forth on the list.

As best shown in FIG. 6, the body of each of the tools 28 has cast or stamped into the surface thereof, so as to be readable with the unaided eye, a part identifier 35' identical to the identifier 35 printed at the bottom of the pocket 24. Laser etched into the surface of each of the tools 28 in at least two locations is a data matrix symbology 36' that contains encoded therein the same information as the data matrix symbology 36 at the bottom of the associated pocket 24. The military desires redundancy to insure that the system will not fail and therefore it is preferable that the data matrix symbology 36' be printed in two locations as shown, rather than in only one. Should the surface of the tool 28, etched with one data matrix code 36,' become so damaged as to be unreadable, the second data matrix code 36' would still be readable.

Referring to FIG. 7, when the tools 28 are not in use, the technician 50 to whom they have been assigned will return all such tools 28 into their associated pockets 24, thereby covering up the brightly colored silhouettes of the tools 28. By glancing at the upper surface 27 of the pallet 22, the technician 50 will see the brightly colored silhouette of all tools 28 that have not been returned to their pockets 24.

While this aspect of the invention has been described with respect to the set of tools contained in the bag 10, the same method is useable to track the tools in a tool box or tools mounted on a vertical wall. A tool box includes a plurality of drawers with each of the drawers having a foam insert with indentations therein in the shape of the tools to be retained similar to the pockets 24 in the foam body 23 described above. Where the tools are mounted on a vertical surface, a silhouette of the tool is printed behind the mounting hooks for retaining the tool and a description of the tool is printed in English and in a data matrix symbology in each silhouette of a tool.

Referring to FIG. 6, another element of the present invention is that for each set of tools, such as the set stored in bag 10, there is a list 46 of all tools 28 in the set 10 provided. Each list 46 has descriptive information 47 at the top thereof to identify the set 10 to which the list 46 relates. Near the descriptive information 47 is a data metric symbology 14' which contains, in code, the same information recorded in the data matrix symbology 14 on the outer surface of the bag 10. Below the descriptive information 47 is a listing of descriptions 49, written in English or in any other language readable with the unaided eye, of all the tools 28 in the bag 10 or other container in which the set is stored. Beside each description 49 in the listing 47 is a data matrix symbology 36" which contains in binary code the identical information contained in the data matrix symbology 36 at the bottom of the pocket 24 containing the tool 28. The list 46 is retained in hard copy form and in the memory of the computer 18 so as to be easily reproduced.

Referring to FIG. 7, the method of the present invention includes the computer 18 for storing all the relevant information relating to the tool control system, at least one scanner 16 for reading data matrix codes 14, 14', 36, 36', 36", and at least one tool kit 10, where the tool kit containing at least one tool 28. In accordance with the invention, each authorized user 50 of a set of tools 10 is also given an identification number and a record is maintained in the computer 18 of the dates of use of each set of tools 10, the identity of the user, and the equipment or plane 51 serviced.

A record is made in the computer 18 each time the tool kit 10 is assigned to a user 50, including the date of use, the plane 51 serviced, and the assignment to be performed. The date and time at which the kit 10 is returned to the primary storage facility 52 is also recorded. A technician in the storage facility 52 verifies that each set of tools 10 contains all of the tools 28 prior to reassigning the set 10 to another user 50. In the event a set 10 is returned without one or more of the tools 28 therein, the scanner 16 can be used to read the data matrix symbology 36 of the missing tool from the bottom of the empty pocket 24 or from the data matrix symbology 36" on the list 46, after which all the information relating to the missing tool 28 will become immediately available. When a lost tool 28 is subsequently found, the data matrix symbology 36' on the tool 28 can be read with the scanner 16. When the scanned information of the tool 28 is compared with the records on the computer 18 the origin of the lost tool can be readily identified.

The invention requires that a two-dimensional data matrix symbology be etched into the surface of every tool and that the etching be so durable that it remains readable after the tool has endured years of hard use and exposure to corrosive chemicals and other adverse elements. The code cannot be etched into a label attached to the tool because the label may become detached from the tool and become a source of FOD, which the system is intended to avoid.

The surface of each tool 28 is different from that of any other of the tool, and since tools by definition are highly functional objects, the surfaces of tools are generally unsuitable for receiving a binary code of any sort. For example, metal tools having a highly polished surface, such as chrome, or a lesser polished surface, such a stainless steel, or a non-reflective surface such as black oxide, are all currently considered unsuitable for receiving a binary code. Tools may also be made of other substances other than metal, such as rubber, wood, and plastic and these surfaces are also unsuitable for receiving a code.

A chrome coating is applied to the surface of a tool to protect the tool against rusting and other forms of corrosion. Chrome, however, is high reflective and has virtually no contrast. Prior to the present invention, an electronically readable binary code could not be etched into the surface of chrome.

Before etching an electronically readable binary data matrix symbology into the surface of a chrome coated tool, the surface of the tool in the general area where the code must be suitably prepared for receiving the code. To prepare a chrome coated surface for receiving a data matrix symbology the surface in the area where the code is to be applied is first scored, or roughed up, using an abrasive material such as a silica. A sandblasting device may be used to score the surface of the chrome-plated tool. Care should be taken so as not to destroy the integrity of the chrome. The intent of the scoring is to reduce the reflective qualities of the chrome, without removing the chrome and exposing the underlying metal to possible deterioration. Thereafter, the prepared surface is coated with a suitable laser responsive epoxy. Such epoxies are available from chemical manufacturing companies of which Ferro Corporation is one. The Ferro product no. LMM-6000 is suitable for use with chrome. The Ferro product LMM-6000 is ethanol based and has a fast drying time.

After an epoxy coating has been applied to the surface of the tool 28 using a spray gun, airbrush, or the like. The epoxy is allowed to dry, after which the data matrix symbology 36' is laser etched into the coated surface using a suitable laser such as a YAG laser. As shown in FIG. 1, the data matrix symbology 14 consists of an irregular pattern of squares, some dark and therefore not generally light reflective, and others light, and therefore more light reflective. When a laser is used to etch a data matrix symbology into a surface, the beam of the laser burns the surface for only one portion of the pattern, either the light or the dark, depending upon the qualities of the material being etched. Where the beam of a laser strikes the epoxy coating on a chrome surface, the epoxy coating is bonded to the surface of the chrome . The coating of epoxy must be have sufficient thickness such that when it is struck by the laser beam enough epoxy is bonded to the chrome to provide sufficient contrast to be readable by a scanner.

After the data matrix symbology 14 has been etched into the coated surface, the chemical applied to the portions of the surface between and around the laser etchings is removed using a suitable cleanser leaving the scored surface of the chrome exposed between patches of bonded epoxy. The epoxy that has received a laser etching is chemically bonded to the chrome so as not to wear away, and there is sufficient contrast between the portions having epoxy bonded thereto and the portions without epoxy, such that the data matrix symbology etched therein is readable by a scanner 16.

It should be appreciated that the laser responsive epoxies such as manufactured by Ferro Corporation and other chemical companies were developed to enable a laser to etch information into such surfaces and provide sufficient contrast for the information to be readable with the unaided human eye. To the knowledge of the inventor the Ferro Corporation does not specifically recommend the use of its product LMM-6000 to mark chrome, and the degree of contrast provided by the application of the above described process to a metal surface was, until the present invention, believed to be insufficient to be electronically readable by a scanner and therefore inadequate for applying an electronically readable code.

Some tools have a black oxide coated surface, which is generally greasy to the touch. To apply a data matrix symbology to a tool with a black oxide surface, the tool is first cleaned to remove all grease and the like. Thereafter, the portions of the surface to which the data matrix symbology is to be applied is scored using an abrasive material such as a silica to remove the black oxide in the area where the code is to be applied. The silica can be sand blasted against the surface to provide the necessary scoring.

After the black oxide has been removed in the area to be etched, an appropriate laser receptive epoxy is applied to the scored surface. The Ferro product no. LMM-6000 is suitable coating for enhancing the contrast of laser etching in the underlying metal. Once the scored surface has been coated with a suitable epoxy, a data matrix symbology containing all the previously described information about the tool is etched into the surface thereof. As in the case with chrome, the laser causes the epoxy to bond with the underlying metal. The excess chemical is again removed and the data matrix code etched into the surface of the tool will be readable by a scanner.

Steps as described with respect to chrome are used to apply a data matrix symbology to a tool made of a stainless steel. Again, Ferro product no. LMM-6000 is usable to enhance contrast to obtain a code readable by a scanner.

In accordance with the invention, a data matrix symbology must also be applied to tools made of rubber, wood, plastic, and composite materials. To prepare tools made of such materials for receiving a laser etching, a pocket or indentation is routed out of the material forming the body of the tool. Thereafter the pocket is filled with an epoxy that will accept a laser etching. Ferro Corporation manufactures such an epoxy which it currently sells as its Yellow Epoxy Laser Markable coating. After the pocket has been filled with the epoxy and the epoxy has hardened, a laser is used to etch the surface of the epoxy and the laser etched surface has sufficient contrast for a two dimensional data matrix symbology to be readable by a scanner.

It should be appreciated that there are numerous technical differences between a one-dimensional bar code of the type in common use and a two dimensional data matrix symbology. Using currently available technology, a one dimensional data matrix code requires an eighty percent contrast between the light and dark areas of the code before the code is readable with a scanner. Chemicals currently available that respond to laser etching provide substantially less contrast than eighty percent, but sufficient contrast that the markings etched therein with a laser are visible to the unaided human eye. As a result, these chemicals are advertised as suitable for applying Arabic numbers and English descriptions which are visually readable, but are not advertised as suitable for providing electronically readable markings. The data matrix symbology, however, is readable by a scanner where the dark and light portions thereof have a contrast as low as twenty percent. Since chemicals that respond to laser etching are currently available that provide at least a twenty-percent contrast, they are suitable for use in applying a two dimensional data matrix symbology that is readable by a scanner 16.

Furthermore, two-dimensional codes are readable with the camera of the scanner 16 in any orientation through 360 degrees, whereas the scanner must be generally held in line to read a linear bar code. Another advantage of the data matrix code is that the scanner 16 can read the data matrix symbology whether it is printed on concave or convex surfaces. Although larger dimensions of the code are more readable than the smaller dimensions, the outer dimensions of the data matrix symbology can be sized so as to be suitable for the dimensions of the tool 28 into which it is etched. It is desirable that the data matrix symbology 14, as shown in FIG. 1, have outer dimensions of at least ¼% inch on each side to insure that the data matrix symbology 14 is a scanner 16.

While the invention has been described with respect to a single embodiment, it will appreciated that many modifications and variations can be made without departing from the spirit and scope of the invention. It is therefore the intent of the following claims to cover all such modifications and variations which fall within the spirit and scope of the invention.

What is claimed:

1. The method for tracking a tool having a part identifier comprising the steps of printing said part identifier at a first location on a surface of said tool in an electronically readable code, printing said part identifier at a second location on said surface of said tool in, an electronically readable code, said printing at said second location containing identical information as that contained in said printing at said first location, said printings on said tool embedded into said surface in/a form that will not be worn away by use of said tool, and providing electronic means for reading said electronically readable code.

2. The method of claim 1 wherein said code is a two dimensional data matrix symbology.

3. The method of claim 1 and further comprising providing a point of storage for said tool, and printing said part identifier at said point of storage in an electronically readable form.

4. The method of claim 1 wherein said tool is one of a set of tools having a tool set identifier for identify said set and said method includes the further step of printing said tool set identifier in said electronically readable code.

5. The method of claim 4 and comprising the further step of using said electronic means to read said electronically readable code on said tool after said tool has been misplaced and subsequently found to thereby identify said set.

6. The method for tracking a plurality of tools grouped together into a set to perform a given task where each of said plurality of tools has an associated part identifier, said method comprising the steps of providing means for retaining said plurality of tools where said means for retaining has a fixed location for each of said plurality of tools, printing on each of said plurality of tools said associated part identifier in an electronically readable code, said printing on said tool embedded into said surface in a form that will not be worn away by use of said tool, printing at said fixed location for each of said plurality of tools said associated part identifier in an electronically readable code, providing electronic means for reading said electronically readable code, providing means for storing said electronically readable codes, using said electronic means to read said part identifier in said electronically readable code from said fixed location for one of said plurality of tools when said one of said plurality of tools cannot be located, and storing said part identifier for said one of said plurality of tools in said memory means until said one of said plurality of tools is located.

7. The method of claim 6 and comprising the further steps of providing in said electronically readable code on one of said plurality of tools a tool set identifier wherein said set from which said one of said plurality of tools originated can be identified by reading said electronically readable printing on said one of said plurality of tools.

8. The method of claim 7 and comprising the further step of providing a silhouette of said one of said plurality of tools at said fixed location therefore.

9. The method of claim 6 and comprising the further steps of recording in said memory a listing of said part identifiers for said plurality of tools that make up said set, providing an authorized user of said set, and recording in said computer that said set has been assigned to said authorized user.

10. The method of claim 9 and comprising the further step of providing a secure storage facility for said set of said plurality of tools, verifying the presence of all of said plurality of tools after the return thereof by said authorized user to said secure storage facility.

11. The method of claim 10 and comprising the further step of using said means for reading said electronically readable code to read the part identifier from said fixed location of one of said plurality of tools if said set is returned by a user without said one of said tools at its said fixed location.

12. The method of claim 11 and comprising the further step of using said means for reading to read said part identifier printed in said code on said one of said plurality of tools to identify said set after said one of said plurality of tools is found.

* * * * *